United States Patent [19]

Watanabe

[11] Patent Number: 4,811,385
[45] Date of Patent: Mar. 7, 1989

[54] DATA COMMUNICATION APPARATUS WHICH CAN SELECTIVELY STORE DATA OR NOT, ACCORDING TO COMMUNICATION LINE STATUS

[75] Inventor: Tsunehiro Watanabe, Tokyo, Japan
[73] Assignee: Canon Kabushiki Kaisha, Tokyo, Japan
[21] Appl. No.: 755,361
[22] Filed: Jul. 16, 1985
[30] Foreign Application Priority Data Jul. 24, 1984 [JP] Japan ............... 59-154704

[51] Int. Cl.⁴ .................. H04M 11/00; H04N 1/32
[52] U.S. Cl. ............................... 379/100; 358/257
[58] Field of Search ............ 179/2 DP, 90 B, 90 BB, 179/90 BD; 358/257; 379/93, 97, 98, 100, 355

[56] References Cited

U.S. PATENT DOCUMENTS

| | | | |
|---|---|---|---|
| 3,920,895 | 11/1975 | Vieri et al. | 358/257 |
| 4,113,991 | 9/1978 | Gorham et al. | 179/90 B |
| 4,207,598 | 6/1980 | Reich et al. | 358/257 X |
| 4,209,668 | 6/1980 | Weinberger et al. | 179/90 B |
| 4,415,981 | 11/1983 | Cutter et al. | 358/257 X |
| 4,494,149 | 1/1985 | Furukawa | 358/257 |
| 4,503,288 | 3/1985 | Kessler | 179/2 DP |
| 4,506,111 | 3/1985 | Takenouchi et al. | 179/2 DP |
| 4,524,393 | 6/1985 | Ohzeki | 358/257 |
| 4,532,379 | 7/1985 | Tsukioka | 179/2 R |
| 4,573,083 | 2/1986 | Shimizu | 358/257 |
| 4,578,535 | 3/1986 | Simmons | 379/100 X |
| 4,581,656 | 4/1986 | Wada | 358/257 |
| 4,642,697 | 2/1987 | Wada | 358/257 |
| 4,646,160 | 2/1987 | Iizuka | 358/257 |
| 4,741,021 | 4/1988 | Kotani et al. | 379/100 |
| 4,764,951 | 8/1988 | Kotani et al. | 379/100 |

*Primary Examiner*—Keith E. George
*Attorney, Agent, or Firm*—Fitzpatrick, Cella, Harper & Scinto

[57] ABSTRACT

A data communication apparatus which automatically communicates data, and has a memory for storing data to be communicated. The apparatus discriminates the status (e.g., busy or not busy) of a communication line, and determines on the basis of that discrimination whether data is to be stored in the memory or not.

20 Claims, 7 Drawing Sheets

FIG. 3(a)A

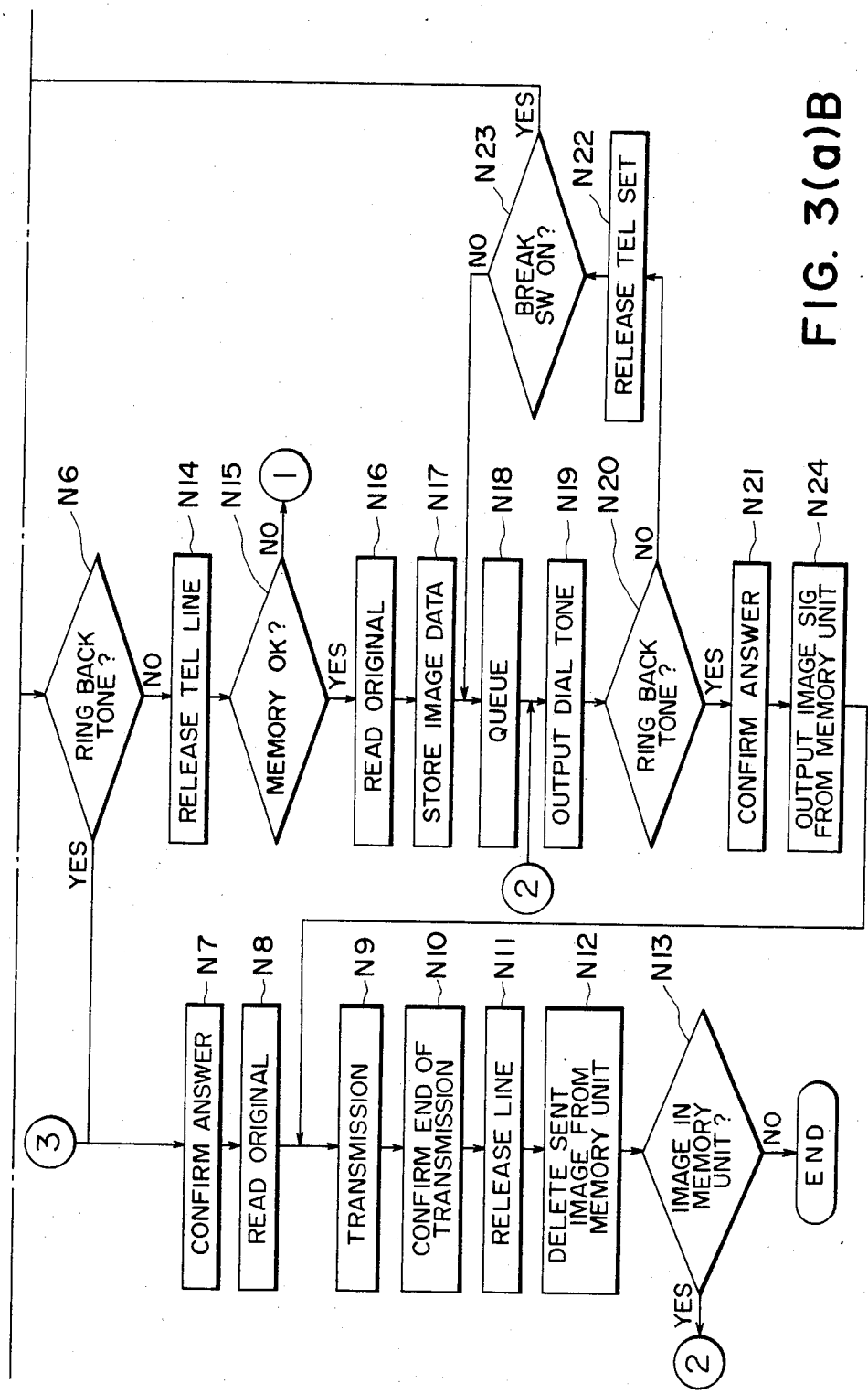
FIG. 3(a)B

DATA COMMUNICATION APPARATUS WHICH CAN SELECTIVELY STORE DATA OR NOT, ACCORDING TO COMMUNICATION LINE STATUS

BACKGROUND OF THE INVENTION

1. Field of the Invention

The present invention relates to a data communication apparatus for transmitting data such as image data or text code data through a communication line.

2. Description of the Prior Art

In a prior art apparatus of this type, an image of an original document was usually transmitted in real time, but as semiconductor technology advanced, it has become possible to temporarily store the image of the original document in a memory and to transmit it from the memory. Thus, an apparatus having both the real-time transmission mode and the memory transmission mode has been proposed. However, in the real-time transmission mode, an operator is not released from the apparatus if a communication line is busy, and in the memory transmission mode, the operation is complex and time-consuming because the image of the original document is stored in the memory irrespective of the busy or non-busy state of the communication line or the image of the original document is sent to the memory after the operator observes the busy state of the communication line.

SUMMARY OF THE INVENTION

It is an object of the present invention to provide an improved data communication apparatus.

It is another object of the present invention to provide an easy-to-operate data communication apparatus.

It is another object of the present invention to provide a data communication apparatus which does not bind an operator for a long time.

It is another object of the present invention to provide a data communication apparatus which stores data when a communication line is busy.

It is another object of the present invention to provide a data communication apparatus which communicates data on a real time basis when a communication line is available, and stores the data when the communication line is busy and communicates the stored data after the communication line becomes available.

According to the present invention, these objects are achieved by providing a data communication apparatus in which it is detected or discriminated whether communication with a particular destination station is feasible, and data to be communicated to that destination station is either sent directly, by control means, or sent through a memory or the like if such communication is not immediately feasible. A setting means may be provided for setting thereon data to be communicated. Additional means may, if desired, be provided to delete from the memory any data stored therein which has already been transmitted. Also, if desired, means may be provided to determine whether the memory contains (for example, after a first transmission) any remaining information to be transmitted, and if so causes such transmission to occur in due course.

Other objects, features and advantages of the present invention will be more fully appreciated from the following detailed description of the preferred embodiments, taken in conjunction with the accompanying drawings.

DETAILED DESCRIPTION OF THE PREFERRED EMBODIMENTS

Figure 1:
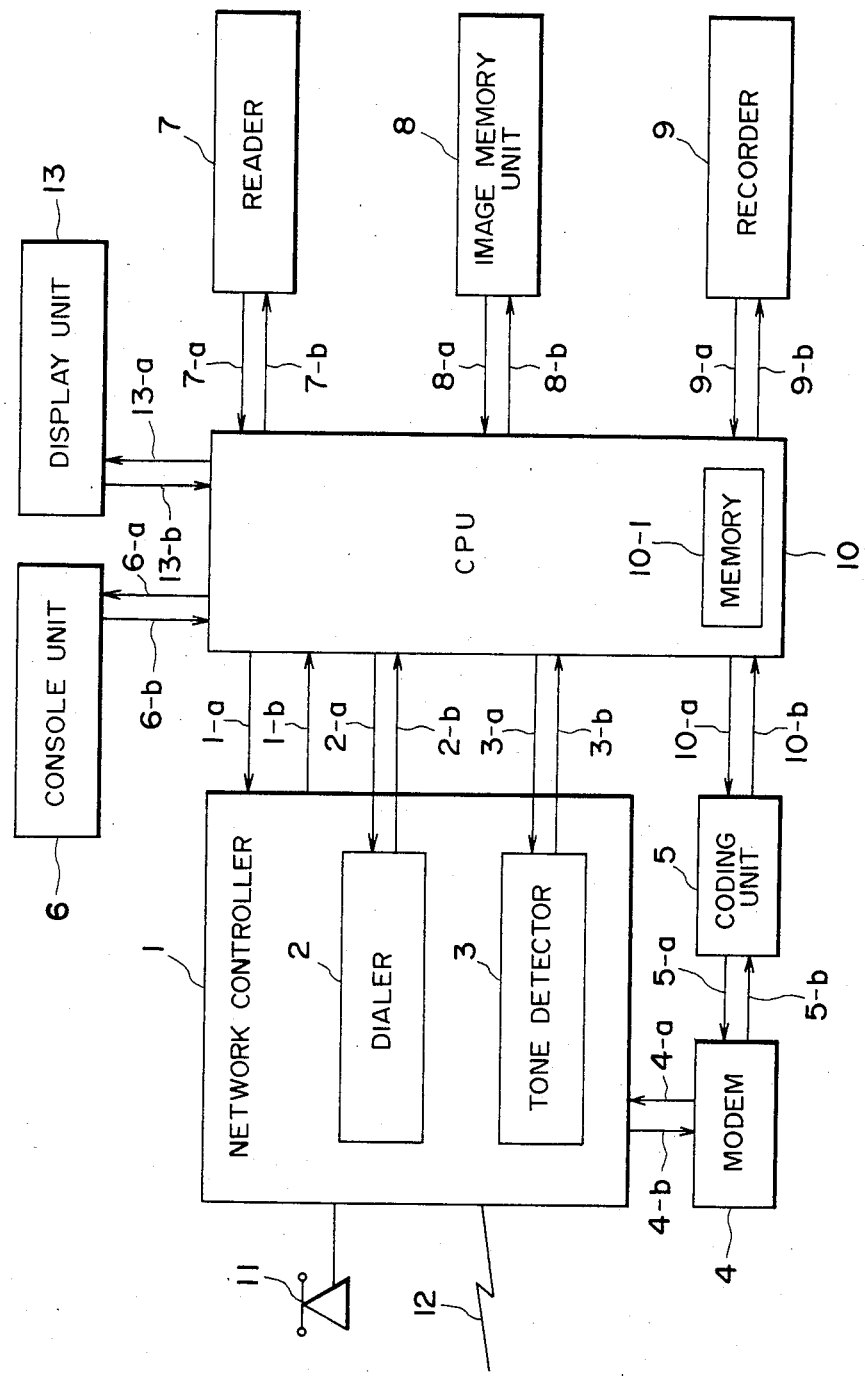
FIG. 1 is a block diagram of an overall configuration of a facsimile machine in accordance with one embodiment of the present invention, FIG. 2, consisting of FIGS. 2A and 2B, is a flow chart of the operation of the embodiment of FIG. 1, FIGS. 3(*a*), consisting of FIGS. 3(*a*)A and 3(*a*)B, and 3(*b*) are flow charts of the operation of another embodiment and, FIG. 4 shows a console unit 6 and a display 13.

FIG. 1 is a block diagram of an overall configuration of one preferred embodiment of an image communication apparatus according to the invention. Numeral 1 denotes a known network controller for controlling a subscriber network to which a facsimile machine is connected, numeral 2 denotes a calling unit (auto-dialer) for generating a dialing signal of a telephone set, and numeral 3 denotes a tone detector (tonal counter) for detecting signal sounds from the telephone network such as a dial tone, busy tone, ring-back tone and guide tape sound for number identification. The calling unit 2 and the tone detector 3 are usually included in the network controller 1.

Numeral 4 denotes a modem which modulates and demodulates signals, and numeral 5 denotes a coding unit which decodes and encodes signals. The facsimile communication is performed by the modem 4 and the coding unit 5. Numeral 6 denotes a console unit having a key entry circuit, numeral 7 denotes a reader having a CCD for reading an image to produce an image signal, numeral 8 denotes an image memory for storing the image signal and data, numeral 9 denotes a recorder which converts the image signal to a visible image in a copy mode or when the content of the image stored in the image memory 8 is to be displayed. It may be a thermal printer or an electrostatic printer. Numeral 10 denotes a central processing unit for controlling the apparatus. It comprises a micro-computer and peripheral equipments. Numeral 10-1 denotes a memory in the central processing unit 10 for temporarily storing a telephone number, a document sheet size or a sheet count. Numeral 11 denotes a telephone set, numeral 12 denotes a telephone line and numeral 13 denotes a display unit such as a liquid crystal display for confirmation by an operator.

Figure 2A:
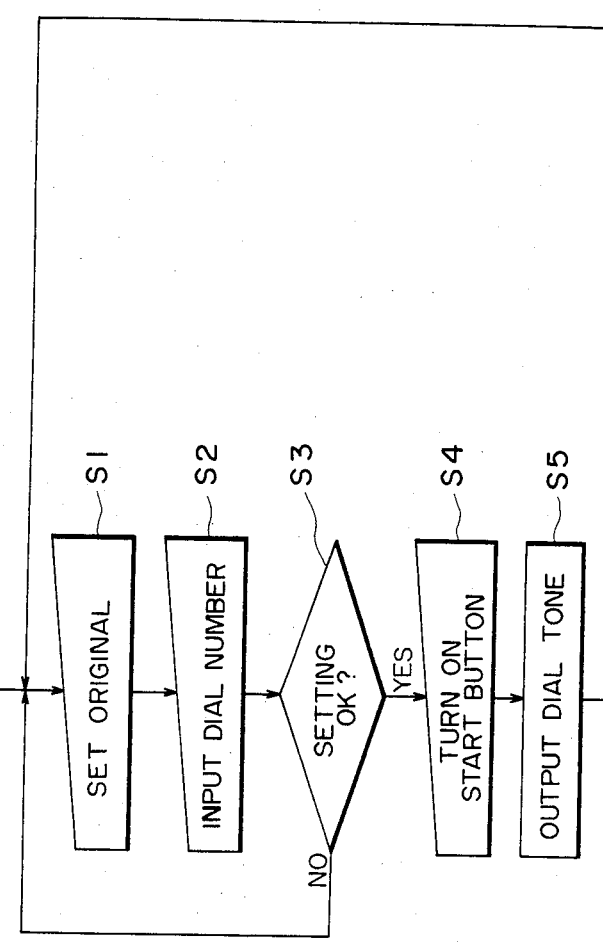
Figure 2:
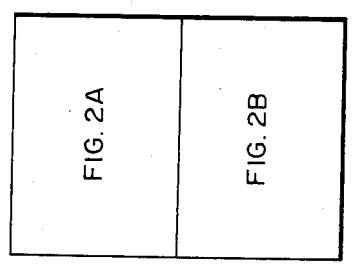
Figure 2B:
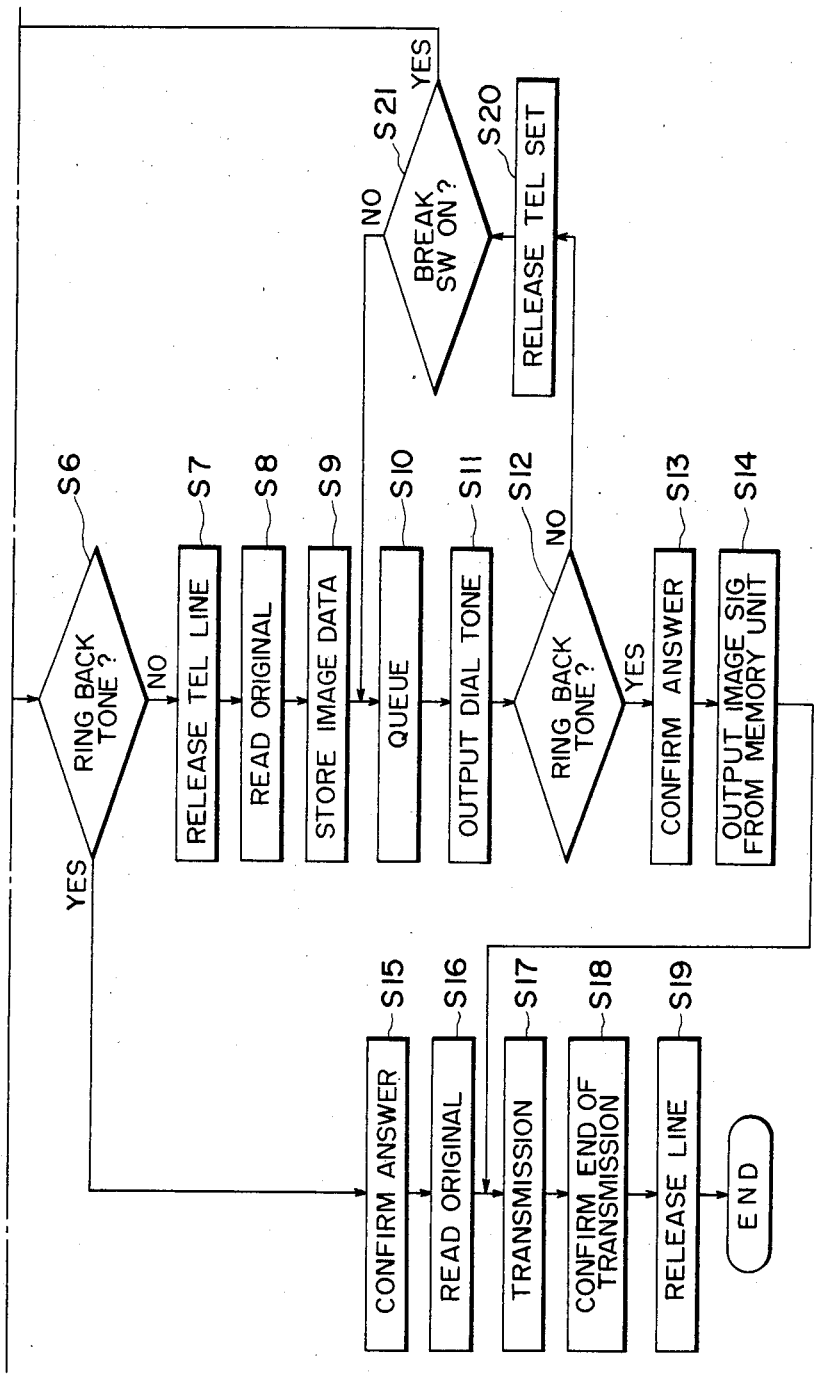

FIG. 2 is a flow chart of the operation of the central processing unit 10. This flow is stored in a program memory of the central processing unit 10.

The operation of the apparatus of FIG. 1 is now explained with reference to the flow chart of FIG. 2.

In a step S1, the operator supplies a document sheet to the reader 7. In a step S2, a telephone number is keyed in through a switch of the console unit 6, and a dial number signal is supplied to the central processing unit 10 and stored in the memory in the central processing unit 10. The telephone number is displayed on the display 13. In a step S3, the central processing unit 10 checks if a document sheet has been loaded and if the telephone number has been keyed in, and those things have been done, the process goes to a step S4, and if they have been not done, the process returns to the step S1.

In the step S4, the operator depresses a start button 6-4 (FIG. 4) on the console panel of the console unit 6. In a step S5, the central processing unit 10 supplies the dial number signal to the calling unit 2 through a signal line 2-a and the calling unit 2 sends out the dial signal to the network controller 1.

A signal sent back from a destination telephone addressed by the calling procedure of the step S5 is received by the tone detector 3 through the telephone line 11 and the network controller 1. The tone detector 3 determines if the sent-back signal is a ring-back tone signal or not, and if it is, the tone detector 3 sets a signal line 3-b to an H-level, and if it is not, the tone detector 3 sets the signal line 3-b to an L-level. The central processing unit 10 determines if the signal line 3-b is H-level or L-level. If it is H-level, the process goes to a step S15, where a destination facsimile machine is identified in accordance with a communication protocol of the CCITT T.30 prior to facsimile communication. In a step S16, the central processing unit 10 sends a read document command code to the reader 7 through a signal line 7-b, and the reader 7 reads the document and sequentially sends the image signal to the central processing unit 10 through a signal line 7-a. In a step S17, the central processing unit 10 sends the image signal received in the step S16 to the coding unit 5 through a signal line 10-a. The coding unit 5 encodes the image signal and sends it to the modem 4 through the signal line 5-a. The modem 4 modulates it to produce a communication signal, which is transmitted through a signal line 4-a and the network controller 1.

In a step S18, the central processing unit 10 checks the end of transmission, and if the transmission has ended, the process goes to a step S19. In the step S19, the central processing unit 10 sends a release telephone line command code to the network controller 1 through the signal line 1-a and the network controller 1 releases the telephone line.

If the signal line 3-b is L-level in the step S6, the process goes to a step S7. In the step S7, the central processing unit 10 sends the release telephone line command code to the network controller 1 through the signal line 1-a and the network controller 1 releases the telephone line. In a step S8, the reader 7 sequentially sends the image signal to the central processing unit 10 through the signal line 7-a in the manner described in the step S16. In a step S9, the central processing unit 10 sequentially sends the image signal to the image memory 8 through a signal line 8-b and the image memory 8 stores the image. Then, the process goes to a step S10. The telephone number stored in the memory of the central processing unit 10 is stored at the start address of the image memory 8.

In the step S10, the process stands by for a predetermined time in accordance with a wait step of the program in the central processing unit 10. In a step S11, the calling operation is carried out in the manner described in the step S5. In a step S12, whether the tone is the ring-back tone or not is checked in the manner described in connection with the step S6, and if it is not the ring-back tone, the process proceeds to a step S20 where the telephone line is released in the manner described in connection with the step S7. Then, the process proceeds to a step S21. In the step S21, the central processing unit 10 checks if a break switch 6-2 (FIG. 4) is on or off. The break switch 6-2 is normally off, and if it is off, the steps S10, S11, S12, S20 and S21 are repeated to automatically recall until a ring-back tone signal is sent back from the destination telephone set.

If the ring-back tone signal is detected in the step S12, the process proceeds to a step S13 where the destination facsimile receiver is checked in the manner described in the step S15. In a step S14, the central processing unit 10 sends a send image signal command code to the image memory 8 through the signal line 8-b and the image signal stored in the image memory 8 is sent to the central processing unit 10 through the signal line 8-a. In the step S17, the image signal is sent out. The steps S17, S18 and S19 have been described above.

During the calling operation, an indication that that operation is in progress is displayed on the display panel of the display 13, and during transmission, an indication of transmission is displayed on the display panel so that the operator can identify it.

If it is required for sending a document while the calling operation for another document is being retrieved, the operator may depress the break switch on the console panel of the console unit 6 to stop the calling operation. When the break switch 6-2 is thus turned on, the central processing unit 10 checks the turn-on of the break switch in a step S21 and the process returns to the step S1 and the calling operation is stopped. Thus, the other document can be transmitted.

In another embodiment of the present invention, an image of a document is transmitted while an image of another document is stored in the image memory 8. the configuration of the present embodiment is identical to that of FIG. 1 and only the communication operation is described.

Figure 3A:
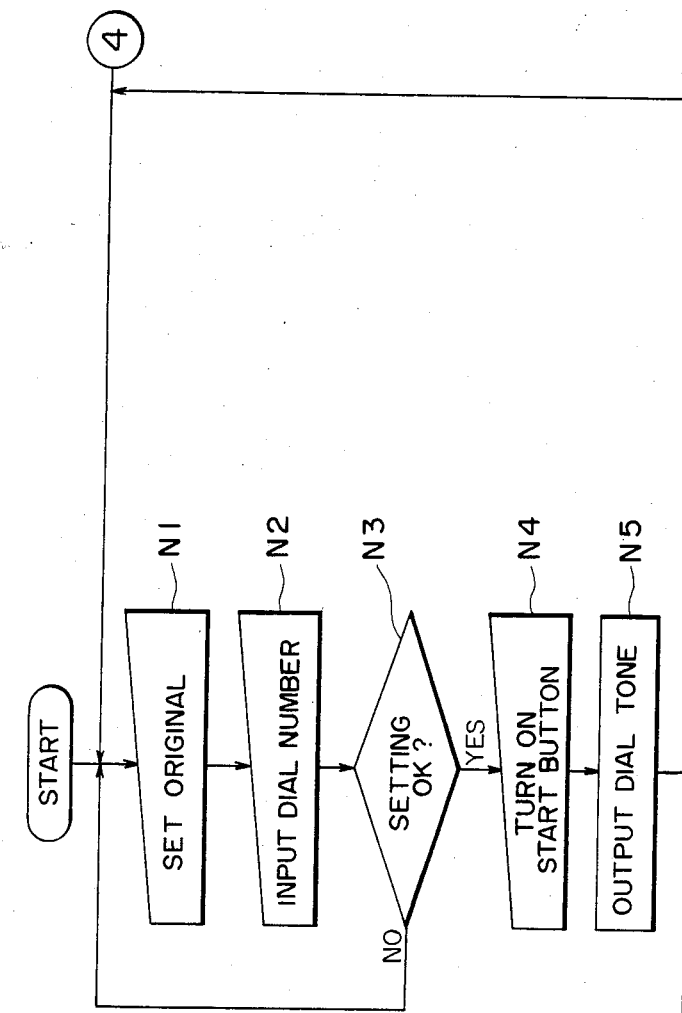
Figure 3A:
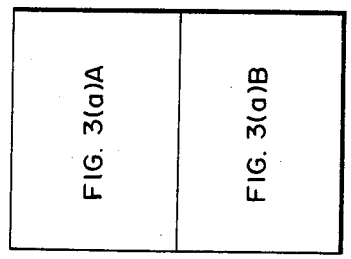
Figure 3B:
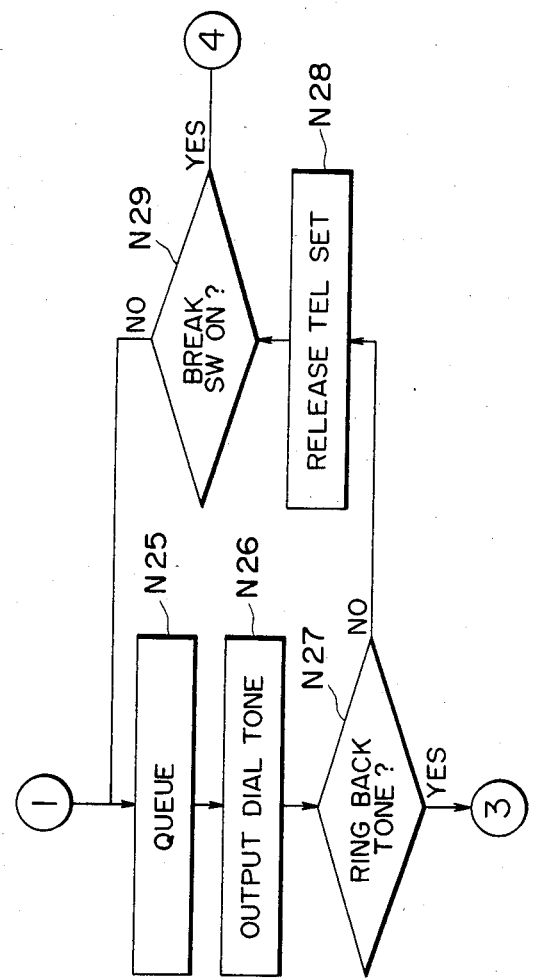

FIGS. 3(a) and 3(b) are flow charts of the communication operation of the facsimile machine in the present embodiment.

In a step N1, the operator loads a document sheet to the reader 7. In a step N2, the operator inputs the number of document sheets, a document sheet size and a telephone number by the switch of the console unit 6. Thus, the signals representing the dial number, the document sheet size and the number of document sheets are sent to the central processing unit 10 through the signal line 6-b and those signals are stored in the memory of the central processing unit 10. The telephone number is displayed on the display 13.

In a step N3, the central processing unit 10 checks if a document sheet has been loaded and a telephone number keyed in, and if so, the process goes to a step N4, and if not, the process returns to the step N1.

In the step N4, the operator depresses a start button 6-4 (FIG. 4) on the console panel of the console unit 6. In a step N5, the central processing unit 10 supplies the dial number signal to the calling unit 2 through a signal line 2-a and the calling unit 2 sends out the dial signal to the network controller 1.

A signal sent back from a destination telephone set by the calling procedure of the step N5 is received by the tone detector 3 through the telephone line 11 and the network controller 1. The tone detector 3 determines if the sent-back signal is a ring-back tone signal or not, and if it is, the tone detector 3 sets a signal line 3-b to an H-level, and if it is not, the tone detector 3 sets the signal line 3-b to an L-level. The central processing unit 10 determines if the signal line 3-b is H-level or L-level. If it is H-level, the process goes to a step N7 where a destination facsimile machine is identified in accordance with a communication protocol of the CCITT T.30 prior to the facsimile communication. In a step N8, the central processing unit 10 sends a read document command code to the reader 7 through a signal line 7-b, and the reader 7 reads the document and sequentially sends the image signal to the central processing unit 10 through a signal line 7-a. In a step N9, the central processing unit 10 sends the image signal received in the step N8 to the coding unit 5 through a signal line 10-a. The coding unit 5 encodes the image signal and sends it to the modem 4 through the signal line 5-a. The modem 4 modulates it to produce a communication signal, which is transmitted through a signal line 4-a and the network controller 1.

In a step N10, the central processing unit 10 checks the end of transmission, and if the transmission was ended, the process goes to a step N11. In the step N11, the central processing unit 10 sends a release telephone line command code to the network controller 1 through the signal line 1-a and the network controller 1 releases the telephone line.

In a step N12, if the transmitted image is the one read from the image memory 8, the image stored in the image memory 8 is erased. If a communication error occurred, the image is not erased. In a step N13, whether an image to be sent to the image memory 8 is present or not is checked, and if it is present, the process proceeds to a step N19, and if it is not present, the transmission operation is terminated.

If the signal line 3-b is L-level in the step N6, the process goes to a step N14. In the step N14, the central processing unit 10 sends the release telephone line command code to the network controller 1 through the signal line 1-a and the network controller 1 releases the telephone line. In a step N15, whether the image memory 8 has a space to store the document image or not is checked. This is done based on the document sheet size and the number of document sheets set in the step N2 and stored in the memory of the central processing unit 10, and the available capacity of the memory 8. If the image memory 8 has the space to store the document image in the step N15, the process proceeds to a step N16, and if it has no space, the process proceeds to a step N25.

In the step N16, the reader 7 sequentially sends the image signal to the processing unit 10 through the signal line 7-a in the manner described in the step N8. In a step N17, the central processing unit 10 sequentially sends the image signal to the image memory 8 through a signal line 8-b and the image memory 8 stores the image. Then, the process goes to a step N18. The telephone number stored in the memory of the central processing unit 10 is stored at the start address of the image memory 8.

In the step N18, the process stands by for a predetermined time in accordance with a wait step of the program in the central processing unit 10. In a step N19, the calling operation is carried out in the manner described in the step N5. In a step N20, whether the tone is the ring-back tone or not is checked in the manner described in the step N6, and if it is not the ring-back tone, the process proceeds to a step N22 where the telephone line is released in the manner described in the step N14. Then, the process proceeds to a step N23. In the step N23, the central processing unit 10 checks if a break switch 6-2 (FIG. 4) is on or off. The break switch 6-2 is normally off. Accordingly, the steps N18, N19, N20, N22 and N23 are repeated to automatically recall until the ring-back tone signal is sent back from the destination telephone set.

If the ring-back tone signal is detected in the step N20, the process proceeds to a step N21, where the destination facsimile receiver is checked in the manner described in the step N7. In a step N24, the central processing unit 10 sends a send image signal command code to the image memory 8 through the signal line 8-b and the image signal stored in the image memory 8 is sent to the central processing unit 10 through the signal line 8-a. In the step N9, the image signal is sent out and the process proceeds to a step 10 and a step 11. The steps N9, N10, N11, N12 and N13 have been described above.

If the image memory 8 does not have space to store the document image in the step N15, the document image is not stored in the image memory 8 and the process proceeds to a step N25 while the document sheet is loaded.

Steps N25, N26, N27, N28 and N29 are same as the steps N18, N19, N20, N22 and N23. If the ring-back tone is detected in the step N27, the process proceeds to the step N7.

During the calling operation, an indication thereof is displayed on the display panel of the display 13, and during transmission, an indication of that operation is displayed on the display panel so that the operator can identify it.

If it is required to send a document while an image of another document is stored in the image memory 8 and recalling is repeated, the break switch 6-2 is turned on to stop the recall operation. Then, the other document sheet is loaded, and the telephone number, the document sheet size and the number of document sheets are entered. If the destination telephone set for the other document sheet is also busy and if the image memory 8 has a space to store the image of the document, the image of the document is read and stored in the image memory 8. If the image memory 8 does not have space to store the image of the document, the recalling may be done while the document sheet is loaded.

When the image is transmitted from the image memory 8, the document image transmitted is erased from the image memory 8. if there is an image stored in the image memory 8, it is automatically transmitted. Accordingly, even if the recalling is interrupted by a request to send another document, the document which was in the recalling process can be automatically sent after the other document has been sent.

In the present embodiment, whether the image memory 8 has space to store the document image or not is checked. Alternatively, the image memory 8 may be divided into two memory areas and the operator may designate the memory area.

The content of the image memory 8 may be sent to the recorder 9 so that the operator can identify the content of the document under the recalling process.

As described hereinabove, according to the present invention, the availability of the communication line is detected and if it is not available, the data is stored, Accordingly, the operator is released from the apparatus in a short time and the work required of the operator is simplified.

Figure 4:
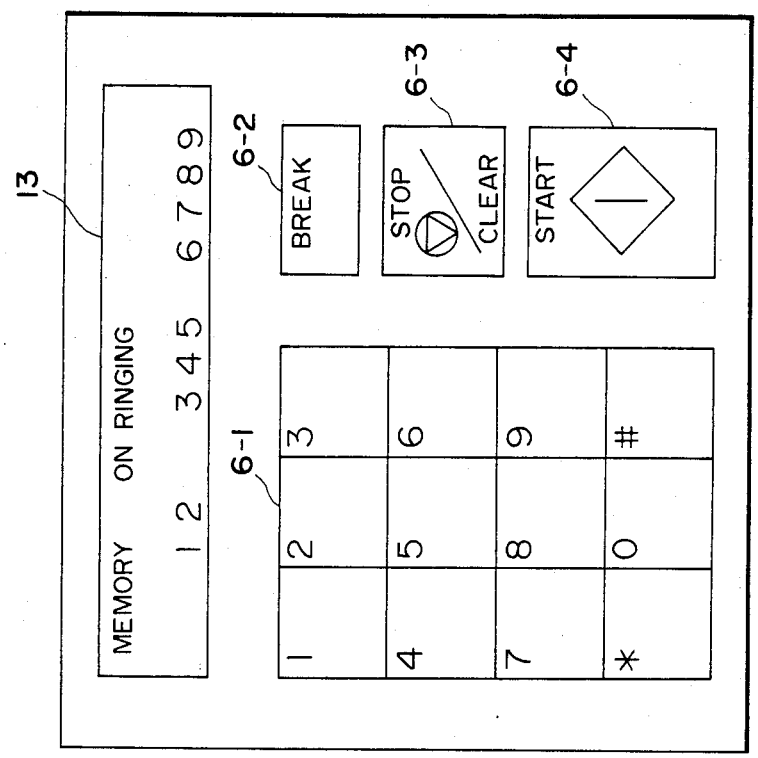

FIG. 4 shows the console unit 6 and the display 13 of the embodiments of the present invention.

The present invention can be applied to not only the image data communication apparatus but also other data communication apparatus which communicates text codes or data.

What is claimed is:

1. A data communication apparatus comprising:
means for reading an original image;
communication means for transmitting image data on a communication line;
memory means for storing image data to be transmitted;
first detection means for detecting whether or not said memory means is capable of storing the image data on the basis of a memory capacity of said memory means and an amount of the stored image data;
second detection means for detecting whether or not a destination station is ready to receive in accordance with a signal from the communication line;
third detection means for detecting whether the image data is stored in said memory means or not; and
control means for controlling transmission of image data in accordance with detection by said first and second detection means, wherein said control means is adapted to select between (1) real time transmission of the image data read by said reading means and (2) storage of the image data in said memory means to transmit the stored image data subsequently in accordance with detection by said first and second detection means; and
wherein said control means is adapted to transmit the image data stored in said memory means on the basis of detection by said second and third detection means that the destination station is ready to receive and that the image data is stored in said memory means, respectively.

2. An apparatus according to claim 1, wherein said control means is adapted to transmit the image data read by said reading means in real time when said second detection means detects that the destination station is ready to receive, and said control means is adapted to store the image data in said memory means in accordance with detection by said first detection means, when said second means, the data is communicated by said memory means and said data communication detects that the destination station is not ready to receive.

3. An apparatus according to claim 1, further comprising destination code send means for sending a destination code of the destination station to the communication line to connect the communication line with the destination station, wherein said second detection means detects whether or not the destination station is ready to receive by discriminating a response signal sent in response to send destination code.

4. A data communication apparatus according to claim 3, wherein said destination code send means sends the destination code after a predetermined time period when said second detection means detects that the destination station is not ready to receive.

5. A data communication apparatus according to claim 1, wherein said memory means erases any data stored therein which have been transmitted.

6. A data communication apparatus according to claim 1, wherein the communication line is a telephone line and said second detection means detects whether the telephone line of the destination station is busy or not.

7. A data communication apparatus comprising
means for reading an original image;
communication means for transmitting image data on a communication line;
memory means for storing therein image data to be transmitted;
detection means for detecting whether a destination station is ready to receive or not, in accordance with a signal from the line;
control means for controlling transmission of image data in accordance with detection by said detection means, wherein said control means is adapted to transmit the image data read by said reading means in real time when the destination station is ready to receive, and, when the destination station is not ready to receive, said control means is adapted to store the image data in said memory means and to transmit the stored image data when the destination station subsequently becomes ready to receive, and
wherein said reading means includes setting means for setting an original image, and reads the original image set in said setting means; and
discrimination means for discriminating whether the data of the original image set in said setting means is storable or not, wherein said control means controls said memory means to store the data set in said setting means provided said discrimination means discriminates that that data is storable.

8. A data communication apparatus according to claim 7, further comprising selection signal sending means for sending a selection signal to the communication line so as to be connected with the destination station for transmission of data to the destination station, wherein said control means causes said memory means to store the data and controls said selection signal sending means to send to the communication line a selection signal for indicating the destination station to which the stored data is to be transmitted.

9. A data communication apparatus according to claim 8, wherein said control means causes said selection signal sending means to send the selection signal at a predetermined interval.

10. A data communication apparatus according to claim 8, wherein said selection signal sending means is dialing means for automatically sending a dial number to the communication line.

11. A data communication apparatus according to claim 7, wherein the communication line is a telephone line and said detection means detects whether the destination station is busy or not.

12. A data communication apparatus according to claim 7, wherein said detection means detects availability of the communication line, and wherein, if the communication line is not available, said control means causes said memory means to store the data in accordance with the discrimination output of said discrimination means, and when the detection output of said detection means indicates availability, causes the data to be communicated from said memory means by said data communication means.

13. A data communication apparatus according to claim 7, further comprising destination code send means for sending a destination code of a destination station to the communication line to connect the communication line with the destination station, wherein said detection means detects the status of the communication line by discriminating a response signal from the communication line for the destination code sent to the communication line by said destination code send means.

14. A data communication apparatus according to claim 13, wherein said destination code send means sends the destination code after a predetermined time period, in the case that said detection means indicates non-availability of the communication line.

15. A data communication apparatus according to claim 7, wherein said memory means erases any data stored therein which have been sent out.

16. A data communication apparatus according to claim 7, wherein said control means is adapted to detect whether the image data is stored in said memory means or not and to transmit the image data stored in said memory means when said control means detects that the image data is stored in said memory means and said detection means detects that the destination station is ready to receive.

17. A data communication apparatus according to claim 7, wherein said data communication apparatus is a facsimile machine for communicating image data.

18. A data communication apparatus according to claim 7, wherein the communication line is a telephone line and said detection means detects whether the telephone line of the destination station is busy or not.

19. A data communication apparatus according to claim 1, wherein said reading means includes setting means for setting an original image, and reads the original image set in said setting means.

20. A data communication apparatus according to claim 1, wherein said data communication apparatus is a facsimile machine for communicating image data.

* * * * *

UNITED STATES PATENT AND TRADEMARK OFFICE
CERTIFICATE OF CORRECTION

PATENT NO. : 4,811,385
DATED : March 7, 1989
INVENTOR(S) : TSUNEHIRO WATANABE

Page 1 of 2

It is certified that error appears in the above-identified patent and that said Letters Patent is hereby corrected as shown below:

COLUMN 2

Line 10, "FIGS. 3(a)," should read --FIG. 3(a),--.
    Line 65, "and those" should read --and if those--.
    Line 67, "have been not" should read --have not been--.

COLUMN 4

Line 29, "the" (second occurrence) should read --The--.

COLUMN 5

Line 60, "step N22" should read --step N22,--.

COLUMN 6

Line 10, "a step 10 and a step 11." should read --a step N10 and a step N11.--.
    Line 35, "a" should be deleted.
    Line 42, "if" should read --If--.

COLUMN 7

Line 40, "said second means, the data is communicated by" should read --said second detection means--.
    Line 41, "said memory means and said data communication" should be deleted.
    Line 50, "send destination code." should read --said destination code.--
    Line 65, "comprising" should read --comprising:--.

UNITED STATES PATENT AND TRADEMARK OFFICE
CERTIFICATE OF CORRECTION

PATENT NO. : 4,811,385

DATED : March 7, 1989

INVENTOR(S) : TSUNEHIRO WATANABE

It is certified that error appears in the above-identified patent and that said Letters Patent is hereby corrected as shown below:

COLUMNM 9

Line 10, "not" should read --not,--.

Signed and Sealed this

Twenty-third Day of January, 1990

Attest:

JEFFREY M. SAMUELS

Attesting Officer     Acting Commissioner of Patents and Trademarks